Oct. 7, 1969   P. H. E. MUNDT ET AL   3,470,642
INTEGRAL TRANSPARENCY FRAME

Filed July 6, 1966   6 Sheets-Sheet 1

INVENTORS
PETER H. E. MUNDT,
PETER FLORJANCIC
BY
Stevens, Davis, Miller & Mosher
ATTORNEYS Oct. 7, 1969  P. H. E. MUNDT ET AL  3,470,642
INTEGRAL TRANSPARENCY FRAME Filed July 6, 1966  6 Sheets-Sheet 3

INVENTORS
PETER H. E. MUNDT,
PETER FLORJANCIC
BY
*Stevens, Davis, Miller & Mosher*
ATTORNEYS Oct. 7, 1969    P. H. E. MUNDT ET AL    3,470,642
INTEGRAL TRANSPARENCY FRAME
Filed July 6, 1966    6 Sheets-Sheet 4

INVENTORS
PETER H. E. MUNDT,
PETER FLORJANCIC
BY *Stevens, Davis, Miller & Mosher*
ATTORNEYS Oct. 7, 1969   P. H. E. MUNDT ET AL   3,470,642
INTEGRAL TRANSPARENCY FRAME
Filed July 6, 1966   6 Sheets-Sheet 5

INVENTORS
PETER H. E. MUNDT,
PETER FLORJANCIC
BY
Stevens, Davis, Miller & Mosher
ATTORNEYS Oct. 7, 1969

P. H. E. MUNDT ET AL 3,470,642

INTEGRAL TRANSPARENCY FRAME

Filed July 6, 1966

INVENTORS
PETER H. E. MUNDT,
PETER FLORJANCIC

BY *Stevens, Davis, Miller & Mosher*

ATTORNEYS

# United States Patent Office 3,470,642
Patented Oct. 7, 1969

3,470,642
INTEGRAL TRANSPARENCY FRAME
Peter H. E. Mundt and Peter Florjancic, Garmisch-Partenkirchen, Germany, assignors to Geimuplast Peter Mundt KG, Farchant, Germany
Filed July 6, 1966, Ser. No. 563,146
Claims priority, application Germany, July 7, 1965, G 44,095; Oct. 15, 1965, G 44,958; Apr. 21, 1966, G 46,659
Int. Cl. G09f 1/12
U.S. Cl. 40—152                                    17 Claims

ABSTRACT OF THE DISCLOSURE

An integral transparency frame comprising two self-supporting frame halves one edge of which defines a slit through which a transparency may be introduced into a pocket, said frame halves being sufficiently resilient at the mouth of said slit so as to afford movement away from each other during insertion of the transparency.

---

This invention relates to an integral transparency frame, which consists of plastics material and is preferably free of glass and has at least at one end an insertion slit, which can be resiliently expanded. According to a prior proposal disclosed in the U.S. patent application Ser. No. 367,528 filed May 14, 1966, the frame portions disposed laterally of the path for the insertion of the transparency are so designed on the level of the insertion slit that the insertion slit can be expanded by pairs of mutually opposing forces which are directed at right angles to the frame against defined points of these specially designed edge portions of the frame. The term "integral" is used in connection with any transparency frame which is integral at the time when a transparency is inserted into it. It is not necessary that the frame is integrally manufactured. Integral transparency frames may be made from two frame sections, which are joined by suitable methods, such as heat-sealing or adhering. The design of a transparency frame according to said prior proposal solves the problem of providing a transparency frame which can be expanded for mounting transparencies by machine.

The present invention relates to improvements in a transparency frame according to said prior proposal. According to the invention, the two frame halves are self-supported on the level of the insertion slit and the insertion slit can be expanded by suction forces which act on the outside of the frame on the level of the insertion slit. This design has the advantage that the frame need not be specially designed for the mounting of transparencies by machine except for the self-supporting arrangement of the two frame sections on the level of the insertion slit. Besides, the expansion by suction forces is very simple.

In a development of the invention, the forces may act in pairs in the plane of the insertion slit in the inserting direction and may be resolved to act at right angles to this plane so as to oppose each other. Within this feature of the invention, the expansion is suitably effected by means of two wedges. The wedges may be adapted to be inserted between the self-supporting frame sections in the inserting direction or from the side edges.

According to the present invention, the transparency frame according to the above-mentioned prior proposal may be designed so that one frame section has inwardly directed, reinforced edge ledges on two opposite sides and the other frame section is embedded between said edge ledges and has an accumulation of material at that face of its embedded edge portions which confronts the embracing frame section. When opposing pressures are then exerted on the side edges of the embracing section of the transparency frame, a leverlike action is obtained at the inwardly directed, reinforced edge ledges of the embracing frame section and moves this frame section outwardly away from the embedded frame section. Due to the special design of the embedded frame section, the latter is also expanded outwardly and away from the embracing frame section. Thus, the transparency frame is expanded not only adjacent to the insertion slit but in its entirety. This has the advantage that the transparency need not be pushed in between the two frame sections but may be alternately pulled in between the two frame sections. For this purpose, a gripper may be moved from one side through the expanded transparency frame to grip the film strip or the transparency and pull it in between the two frame sections. The gripper may engage only the margin of the transparency without contacting it in the picture area.

In a further development of the invention, the embracing frame section is provided with at least one slip-in opening for a connecting lug, which is provided on the other frame section. By the same design which enables the expansion of the embedded frame section, the same is thus also provided with means for its fixation to the embracing frame section.

The invention may also be embodied in such a manner that that edges of the embedded frame section which engages the edge ledges of the embracing frame section is at least partly reduced on a level from the inside to the outside, and the embedded frame section is clamped at its protruding edge between the two edge ledges of the embracing frame section. In this case too, one and the same design feature serves for expanding the frame and for joining the two frame sections.

In a further development of the invention, the embracing frame section has indentations opposite to the four edges of the embedded frame section and one frame section has central spacers on both sides of the picture aperture. Such frame may also be expanded by arresting it with the embedded frame section underneath and supporting it approximately midway between the two insertion slits whereafter, the embedded frame section is expanded with the aid of pins, which extend through the indentations of the embracing frame section. In this embodiment too, a gripper may be moved through between the two frame sections. The pulling or moving of the transparency into the frame is facilitated by the spaces, which keep open an insertion path for the transparency also at the time when the embedded frame section is downwardly depressed relative to the embracing frame section so that the longitudinal edges of the embedded frame section have an arcuate configuration.

The present invention relates further to a development of the transparency frame according to the above-mentioned prior proposal, in which one frame section is provided with bores on the side which is intended for the insertion of the transparency, which bores are disposed outside of the insertion path for the transparency and permit of an insertion of expanding pins for lifting the cover and providing an insertion slot. The expanding pins are provided on a mounting machine and extend through the bores in the one frame section and lift the cover section against the action of its resiliency on the side where the transparency is to be inserted. If the frame section is provided with such bores at all four corners, it is no longer necessary to take care that the transparency frame is inserted into the mounting machine with a specific side ahead. The cover may be sufficiently lifted to permit of a convenient insertion of the transparency. When the action of the force has ceased because the expanding pins have been retracted, the cover section springs back and retains the transparency in its receiving pocket, which is somewhat recessed relative to the adjacent frame portions so that a lateral displacement of the transparency is precluded.

Alternatively, the transparency frame may be expanded by subjecting that side of the cover section where the transparency is to be introduced to the action of means which exert a suction to provide a slot for the insertion of the transparency.

Both embodiments afford the advantage that all edge faces of the transparency frame are smooth. Besides, there is no need to provide a special insertion slit because the same is formed by the lifting of the cover beyond the edge of the other frame section.

Transparency frames were originally made from sheet metal frames which were pushed one into the other to enclose glass planes, between which the transparency was disposed. Frames of this type have also been made of plastics materials. In connection with such frames, their complicated design and the complication involved in the mounting of the transparencies have created a desire for improvement.

To facilitate the mounting of transparencies, cardboard frames have been disclosed, which consist of two frames, which are connected to each other and hold the transparency between them. These cardboard frames distinguish by a light weight and a small thickness. They have the disadvantage that the material has only a low strength and that in automatic projectors, in which the transparencies are moved by a slider from a magazine into the projection axis and back, the slider often tends to slip laterally past the frame during the shifting thereof so that the showing of the transparencies is interrupted. To avoid these disadvantages and the wear at the edges of the frame as well as to provide surfaces for engagement by the transparency slider, transparency frames of cardboard have been disclosed, which are provided with shaped slip-on parts, e.g., of sheet metal, which are substantially U-shaped in cross-section and embrace the edge and are firmly but detachably attached to the frame proper. This arrangement affords protection not only of the edge which is engageable by the transparency slider but also of the edge portion which is engageable by the return slider, and a reliable engagement of the return slider is ensured. The shaped parts may extend throughout the length of the respective sides or over part thereof, e.g., only over that part which cooperates with the slider. The shaped parts prevent in an advantageous manner a bending or warping of the frame. This has a desirable effect on the flatness of the transparency and consequently on the quality of the picture. These cardboard frames can be used only once and must be destroyed when a transparency is to be exchanged.

Other known transparencies consist of injection-molded plastics material and have a thickness of about 3 mm. The provision of frames of plastics materials having a smaller thickness is particularly advantageous for so-called stacking projectors but involves the difficulty that frames made of injection-molded plastics material are distorted due to the high temperature rise effected during projection. This disadvantage cannot be eliminated by a selection of a material which is stable at higher temperatures because any plastics material which can be injection-molded is thermoplastic and must be inexpensive to be suitable for use in the manufacture of transparency frames made of plastics material. As the temperature rise of frames made of plastics material is mainly due to the intense radiation to which the frame portions adjacent to the edge of the picture are subjected and to the high absorption of the light rays by the dark-colored plastics material, whereas the heat transfer by conduction is very small, an excessive absorption of light has been precluded by providing an opaque frame which consist of plastics material and are entirely or partly light-reflecting, e.g., by providing them with a mirror coating. For this purpose, a reflecting layer, e.g., of aluminum, may be applied after the manufacture of the frame by spray coating, vapor coating, spreading or be adhered in the form of metal foil or inlaid into the frame. To simplify the manufacture of such transparency frames provided with light-reflecting means, it has already been disclosed to use an injection-moldable plastics material, which has light-impermeable or light-repelling admixtures, such as aluminum powder or titanium white. These measures have also provide inadequate because the light-impermeable and light-repelling admixtures cannot be admixed to the injection-moldable plastics material in a quantity which is sufficient to eliminate the danger of a distortion under an excessive action of light.

Another problem arising in connection of transparency frames having a very small wall thickness is the permeability to light. In general, plastics material may be rendered satisfactorily impermeable to light. By the admixture of color pigments, however, the absorption of heat is increased so that the high-temperature stability is reduced.

For this reason it is another object of the invention to provide a transparency frame which is not thicker than a cardboard frame, has the stiffness and mechanical strength of a frame of plastics material, does not distort even under a strong action of light, and has a high-temperature stability which is independent of its impermeability to light.

In a transparency frame of the type described initially hereinbefore, this object is accomplished according to the invention in that that frame section which faces the light source during projection consists of a heat-resisting and light-impermeable material, such as cardboard, at least adjacent to the edge portions which define the picture aperture, whereas the remaining frame consists of an injection-molded plastics material. The transparency frame according to the invention has the stiffness and mechanical strength of a frame made of plastics material but is free of the disadvantages of the latter regarding the danger of distortion under an excessive action of light. The frame according to the invention has also the advantages of the known cardboard frames as regards small thickness, light weight, impermeability to light and stability at high temperatures. The known disadvantages of cardboard frames are avoided. The transparency frame according to the invention may be manufactured in a simple, fast and inexpensive method. Finally, the transparency frame according to the invention constitutes a sudden advance in the art because it may be used for a mounting of transparencies on machines. When it is desired to exchange a transparency, the frame need not be destroyed. It may also be used with the popular uncooled projectors without a danger that the temperature rise encountered in such projectors may result in such a distortion of the transparency frame that the latter is unusable. The transparency frame according to the invention has a small thickness, which is about 1.3 mm., so that the frame is particularly suitable in so-called stacking projectors, in which the individual transparency frame should occupy only a very small space. Another advantage of the transparency frame according to the invention resides in that inscriptions of all kinds may be applied to it by simple and speedy printing processes. This is not easy with a frame made of plastics material.

Various embodiments of the invention will be explained by way of example hereinafter with reference to the accompanying drawings, in which FIG. 1 is a perspective view showing a frame according to the invention, which can be expanded by suction forces.

Figure 1:
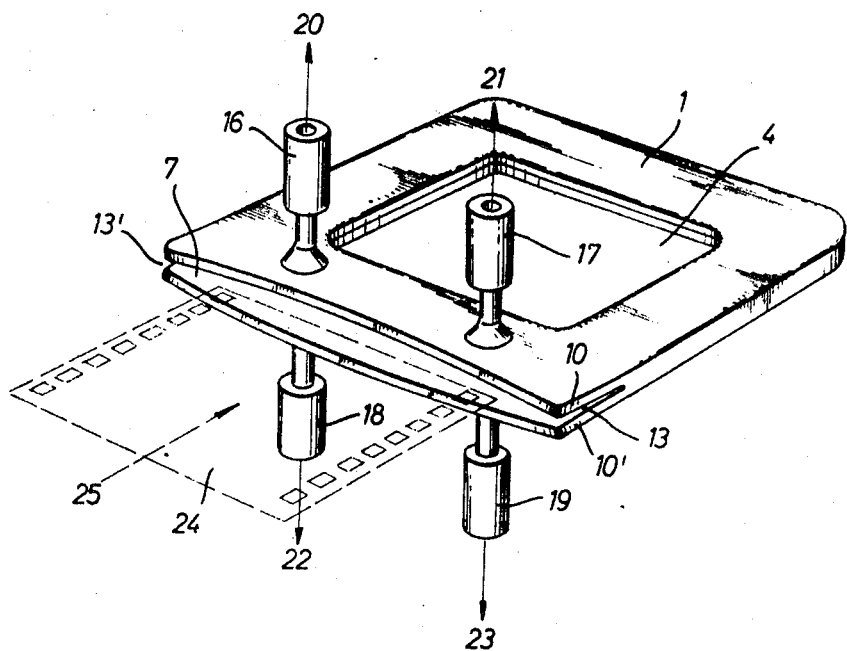

In all three embodiments, the transparency frames 1 or 2 or 3 are integrally made from resilient material, closed on three sides and provided each with the usual projection aperture 4 or 5 or 6 and at one end with an insertion slot 7 or 8 or 9. In all embodiments, the two frame sections 10, 10' or 11, 11' or 12, 12' are designed to be self-supporting so that the insertion slot 7 or 8 or 9 extends into the side edges of the frame and forms there a gap 13 or 14 or 15.

In the embodiment shown in FIG. 1, the expansion is effected with the aid of pairs of opposing vacuum cups 16 to 19, which are applied at right angles to the frame. It will be understood that the number of vacuum cups may be varied in dependence on the thickness of the frame and on the suction force which is available.

The vacuum cups are connected to a conduit, not shown, which leads to a vacuum pump so that forces acting in the direction of the arrows 20 to 23 may be applied to the outside of the frame on the level of the insertion slit to expand the frame as is shown. The transparency 24 may then be inserted into the frame in the direction of arrow 25 without danger of canting, even if locking cams, not shown, are provided in the insertion slit to prevent a falling of the transparency out of the frame.

Figure 2:
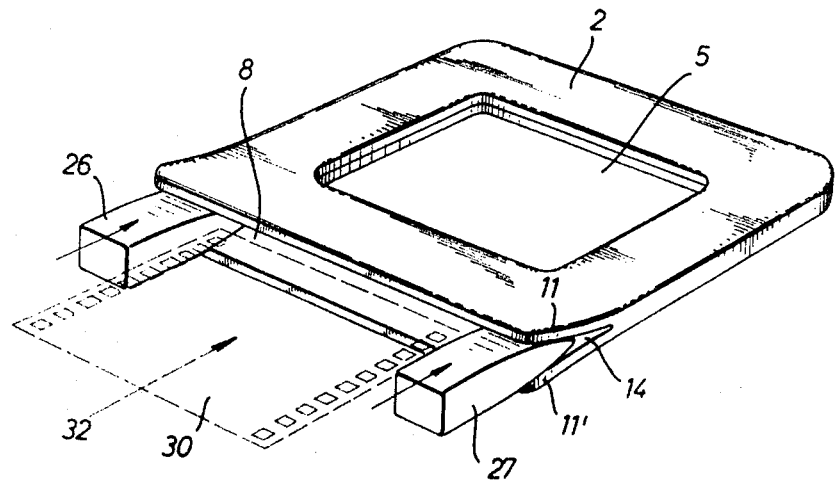
FIG. 2 is a similar view showing a frame according to the invention which can be expanded with the aid of wedges.
Figure 3:
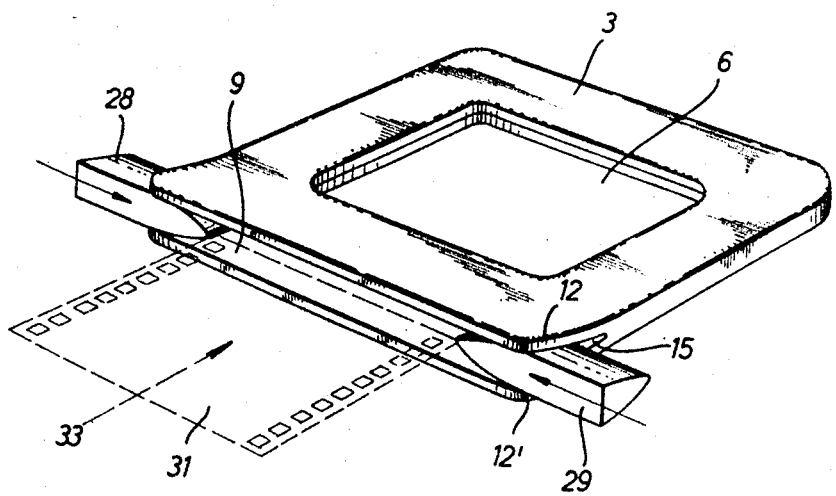
FIG. 3 shows a modification of the embodiment of FIG. 2.
Figure 4:
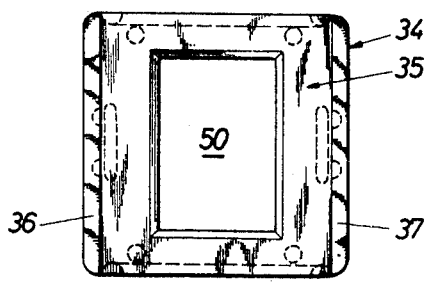
FIG. 4 is a top plan view showing a frame according to the invention, with the embedded frame section on top.
Figure 5:
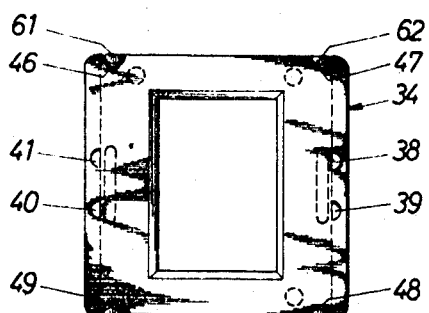
FIG. 5 is a top plan view showing the same embodiment with the embracing frame section on top.
Figure 6:
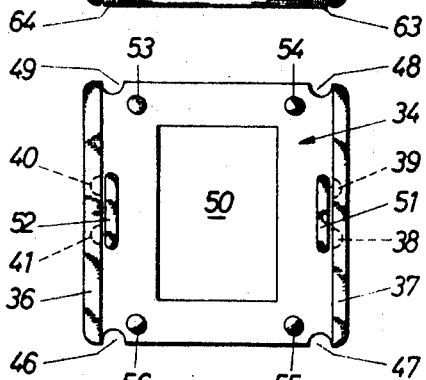
FIG. 6 is a top plan view showing the inside of the embracing frame section of this embodiment.
Figure 7:
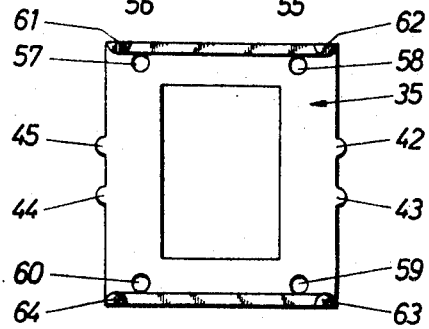
FIG. 7 is a top plan view showing the inside of the embedded frame section of the same embodiment.
Figure 8:
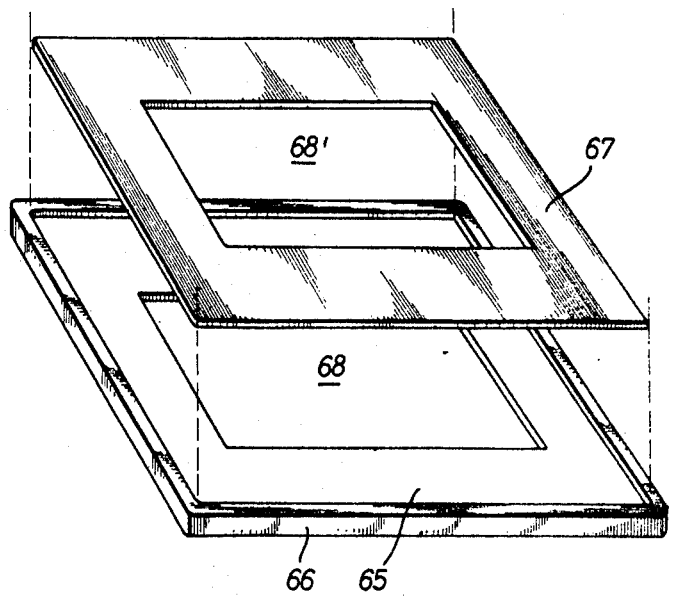
FIG. 8 shows parts of another embodiment of a transparency frame according to the invention before the use thereof.

In the embodiments shown in FIGS. 2 and 3, the frame is expanded with the aid of wedges 26, 27 or 28, 29. The wedges are adapted to be inserted between the self-supporting frame sections in the direction in which the transparency is introduced, as is shown in FIG. 2, or from the side edges of the frame. In both cases the forces can be applied in pairs in the plane of the insertion slot in the direction in which the transparency is inserted and can be resolved to act at right angles to this plane so as to oppose each other. In both cases the insertion slot 8 or 9 is expanded as shown so that the transparency 30 or 31 can be inserted into the frame in the direction of the arrow 32 or 33 without any danger of scratching the transparency.

An inferior embodiment of the invention would be obtained if the two frame sections were not self-supporting on the level of the insertion slot. In that case, higher suction forces would have to be applied in the embodiment of FIG. 1. In the embodiment shown in FIG. 2 it would be difficult to provide the space required for the insertion of the wedges 26, 27. These difficulties could be eliminated by using smaller wedges or a broader frame.

The transparency frame made in FIGS. 4 to 7 consists of plastics material and comprises an embracing frame section 34 and an embedded frame section 35. The embracing frame section 34 has inwardly directed, reinforced edge ledges 36 and 37. The embracing frame section 34 is provided with four slip-in openings 38 to 41 for receiving registering connecting lugs 42 to 45 formed on the embedded frame section 35.

The embracing frame section 34 has indentations 46 to 49 opposite to the four edges of the embedded frame section 35. The embracing frame section has on both sides of the picture aperture 50 centrally disposed spacers 51 and 52. On the two sides where the transparency can be inserted, the embracing frame section 34 is provided with cams 53 to 55, which are spaced approximately like the perforations of the transparency. The embedded frame section 35 is provided on the inside with corresponding grooves 57 to 60. The cams and grooves form interengaging locking elements, which prevent a slipping of the mounted transparency out of the frame.

Finally, the embedded frame section 35 is provided with projections 61 to 64 in registry with the indentations 46 to 49 of the embracing frame section 34.

The present invention has the further advantage that during the mounting of transparencies by machine it makes no difference whether the frame is inserted into the mounting machine with one or the other insertion slits provided between the two frame sections for the insertion of the transparency is ahead when the frame is being inserted into the molding machine.

The transparency frame shown in FIGS. 8 to 11 consists of a frame section 65 which has an inturned peripheral rim 66, the height $a$ of which determines the thickness of the transparency frame. This frame section 65 is made of plastics material and has the usual picture aperture 68.

The other frame section consists of a flat cover 67 of cardboard. This frame section has also the usual picture aperture 68'.

The two frame sections 65 and 67 may be connected as desired. The rim 66 of the frame section 65 of plastics material may be provided with a corresponding internal groove, into which the cardboard frame section is forced in such a manner that the resiliency of this material is utilized. Alternatively, the two frame sections may be joined by high frequency welding or by the action of ultrasonics. For a joining by high frequency welding, that side of the cover part 67 which faces the frame section 65 of plastics material must be properly prepared.

As the cardboard cover section 67 is surrounded throughout its periphery by the rim 66 of the frame section 65 of plastics material, the edge faces of the transparency frame have the required stiffness and mechanical strength.

Figure 9:
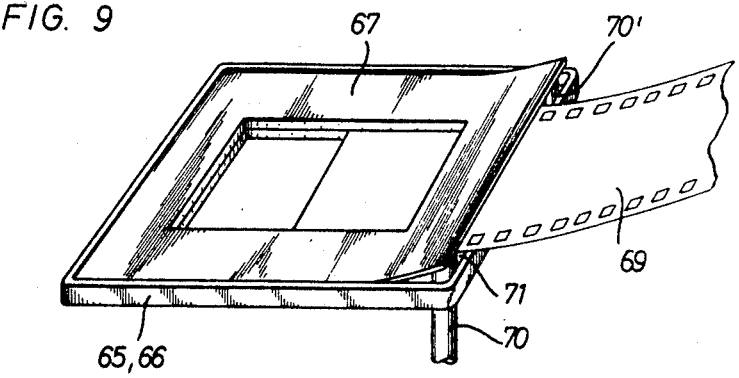
FIG. 9 shows the finished frame of the same embodiment while a transparency is being inserted by a machine.

A particularly advantageous embodiment of the transparency frame according to the invention is shown in FIG. 9. The design of the frame is in accordance with the description of FIG. 8. The only difference resides in that the cover 67 is only in loose contact with the frame section 65 of plastics material on the side where the transparency 69 is to be introduced so that an insertion slot 71 for a mounting of transparencies by machine can be provided with the aid of suitable means of a mounting machine, e.g., by means of two pins 70, 70'.

Figure 10:
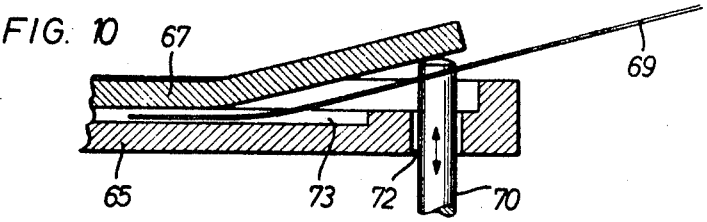
FIG. 10 is a transverse sectional view showing a frame of the same embodiment during the insertion of a film and FIG. 11 is a transverse sectional view of the same frame when the transparency has been mounted.
Figure 11:
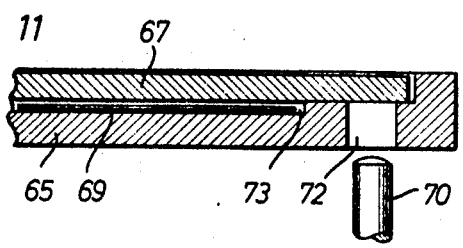

It is also apparent from FIGS. 10 and 11 that the transparency frame is provided in its frame section 65 of plastics material with two bores 72 of its two upper corners to enable a serial mounting of transparencies by machine. The pins 70, 70' provided on a mounting machine, not shown, extend through these bores 72 in the frame section 65 and lift the cover section 67 against the action of its resilient force on the side where the transparency is to be inserted. As is apparent from FIG. 10, the cover 67 can be lifted sufficiently for a convenient insertion of the transparency 69. When the application of force is terminated because the pins 70, 70' are retracted, the cover section 67 springs back to retain in its receiving pocket 73 the transparency 69. This pocket is somewhat recessed relative to the adjacent frame portions so that the transparency 69 cannot shift laterally.

Alternatively, the transparency frame may be expanded by subjecting the cover section 67, on that side where the transparency is to be introduced, to the action of suction means for providing a slot for the insertion of the transparency.

Both embodiments have the advantage that all edge faces of the transparency frame are smooth. When the transparency 69 has been mounted, the expansible portion of the cover 67 may be firmly joined to the frame section 65 by sealing or adhering.

Regarding the expansion, the subject matter of the application distinguishes in that a special insertion slit or slot is not required because this slot is provided by lifting the cover 67 above the rim 66.

When the transparency has been mounted in the transparency frame according to the invention, the same has the appearance which is shown by the transverse sectional view shown in FIG. 11.

What is claimed is:

1. An integral transparency frame, which consists of plastic material and is preferably free of glass and has at least at one end an insertion slit, which can be resiliently expanded and which extends a short distance along the two adjacent sides, in which frame the frame portions disposed laterally of the path for the insertion of the transparency are so designed on the level of the insertion slot that the insertion slit can be expanded by pairs of mutually opposing forces which are directed at right angles to the frame against defined points of these specially designed edge portions of the frame, characterized in that the two frame halves are self-supporting on the level of the insertion slit.

2. An integral transparency frame, which consists of plastic material and is preferably free of glass and has at least at one end an insertion slit, which can be resiliently expanded, in which frame the frame portions disposed laterally of the path for the insertion of the transparency are so designed on the level of the insertion slit that the insertion slit can be expanded by pairs of mutually opposing forces which are directed at right angles to the frame against defined points of these specially designed edge portions of the frame, characterized in that one frame section has inwardly directed, reinforced edge ledges on two opposite sides and the other frame section is embedded between said edge ledges and has an accummulation of material at that face of its embedded edge portions which confronts the embracing frame section.

3. A frame according to claim 2, characterized in that the embracing frame section is provided with at least one slip-in opening for a connecting lug, which is provided on the other frame section.

4. A frame according to claim 2, characterized in that that edge of the embedded frame section which engages the edge ledges of the embracing frame section is at least partly reduced on a level from the inside to the outside, and the embedded frame section is clamped at its protruding edge between the two edge ledges of the embracing frame section.

5. A frame according to claim 2, characterized in that the embracing frame section has indentations opposite to the four edges of the embedded frame section and one frame section has central spacers on both sides of the picture aperture.

6. A frame according to claim 2, characterized in that the two frame sections are provided with interengaging locking elements on the side where the transparency is to be inserted and on the opposite side to prevent a slipping of the transparency out of the frame, the spacing of said locking elements being approximately the same as the spacing of the perforations of the transparency.

7. An integral transparency frame, which consists of plastic material and is preferably free of glass and has at least at one end an insertion slit, which can be resiliently expanded, in which frame the frame portions disposed laterally of the path for the insertion of the transparency are so designed on the level of the insertion slit that the insertion slit can be expanded by pairs of mutually opposing forces which are directed at right angles to the frame against defined points of these specially designed edge portions of the frame, characterized in that one frame section is provided with a peripheral rim, in which the other frame section, designed as a cover, is embedded, and the frame section provided with the rim is formed with bores, which are disposed outside the path for the insertion of the transparency and through which expanding pins can be inserted to lift the cover and provide an insertion slot.

8. An integral transparency frame of substantially rectangular shape and comprising resilient plastic material, said frame having a central aperture and an inner pocket, at least one marginal portion of said frame having a slit defined by self-supporting frame parts which extends for a short distance along the two adjacent marginal portions, thereby forming an entry slit to facilitate insertion of the transparency into said pocket.

9. An integral transparency frame comprising two substantially rectangular self-supporting frame sections having a central aperture and joined together to form a pocket therebetween, said frame having a slit extending along at least one point defined by said sections and extending for a short distance along the two adjacent joints, thereby forming an entry slit to facilitate insertion of the transparency into said pocket.

10. A frame as defined by claim 9 wherein one frame section is received within the other frame section.

11. A frame as defined by claim 10 wherein said other frame section is provided with a peripheral rim which overlaps and abuts said one frame section.

12. A frame as defined by claim 11 wherein said other frame section consists of plastic material and wherein the thickness of said peripheral rim is approximately 1.3 mm.

13. A frame as defined by claim 9 wherein at least the portion adjacent the central aperture of the frame section facing the light source during projection consists of a heat-resisting and light-impermeable material, and wherein the remaining portions of the frame consist of an injection-molded plastic material.

14. A frame as defined by claim 13 wherein said frame section facing the light source loosely engages the other frame section on said one point, thereby providing an insertion slit through which the transparency is inserted.

15. A frame as defined by claim 13 wherein said frame section consisting entirely of plastic material contains a pocket for receiving the transparency, said pocket being recessed relative to the adjacent frame portion.

16. A frame as defined by claim 9 wherein said frame sections have been joined together by high frequency welding.

17. A frame as defined by claim 9 wherein said frame sections have been joined together by the action of ultrasonics.

References Cited

UNITED STATES PATENTS

| | | | |
|---|---|---|---|
| 598,537 | 2/1898 | Rosenzweig | 40—159 |
| 1,376,677 | 5/1921 | Coufal | 40—152 |
| 1,995,518 | 3/1935 | Perry | 40—159 X |
| 2,528,366 | 10/1950 | Houston | 40—159 |
| 2,841,903 | 7/1958 | Christensen | 40—152 |

EUGENE R. CAPOZIO, Primary Examiner

WENCESLAO J. CONTRERAS, Assistant Examiner